AUTOMATIC PHONOGRAPH RECORD SELECTION

Filed April 8, 1968 3 Sheets-Sheet 1

INVENTOR
CASIMER J. DABROWSKI
BY Ronald J. Engel
Atty

Nov. 17, 1970 C. J. DABROWSKI 3,541,514

AUTOMATIC PHONOGRAPH RECORD SELECTION

Filed April 8, 1968 3 Sheets-Sheet 2

INVENTOR
CASIMER J. DABROWSKI

BY Ronald J. Engel
Atty

AUTOMATIC PHONOGRAPH RECORD SELECTION

INVENTOR
CASIMER J. DABROWSKI
BY
[signature]
ATTY

United States Patent Office 3,541,514
Patented Nov. 17, 1970

3,541,514
AUTOMATIC PHONOGRAPH RECORD SELECTION
Casimer J. Dabrowski, Mount Prospect, Ill., assignor, by mesne assignments, to The Seeburg Corporation of Delaware, Chicago, Ill., a corporation of Delaware
Filed Apr. 8, 1966, Ser. No. 541,192
Int. Cl. H04q 3/00
U.S. Cl. 340—162 17 Claims

ABSTRACT OF THE DISCLOSURE

The selection of recordings in a coin-operated phonograph is controlled by two separate selection circuits. One of the selection circuits provides for the choice of individual selections by a customer, while the other selection circuit controls the playing of a chosen preselected program of records when no individual selection choices have been made. Provision is made for insuring that only one selection circuit is controlling selection at any given time and that individual selection choices are given precedence.

This invention relates generally to the automatic selection of phonograph records to be played and, more particularly, to a system adapted to provide for the automatic selection of a plurality of records in accordance with a pretermined program choice or for the selection of individual record choices as desired.

The automatic selection and reproduction, or playing, of a phonograph record which has been chosen for play is well known in the art, as for example in the so-called "juke box." A particularly suitable selection system for this purpose, involving the use of memory storage devices such as magnetic cores, is illustrated in U.S. Pat. No. 2,923,553—Schultz et al., assigned to the same assignee as the present invention. In the Schultz et al. system, an individual magnetizable element (magnetic core) is associated with each side of a record that may be chosen for play. A person choosing a record that he desires to hear pushes two separate buttons or switch actuators (e.g., a letter button and a number button, such as "G–6" for a particular play). These two switch actuators each control the energization of a magnetizing coil magnetically connected to a predetermined plurality of magnetic cores in a matrix of such cores. Only one of the magnetic cores in the matrix is magnetically connected to both of the magnetizing coils controlled by the two switch actuators, so that the two switch actuators serve to designate one and only one magnetic core in the matrix. The flux produced by the joint action of the magnetizing coils is sufficient to magnetize the designated core in a given sense, indicating the choice of its associated record, but the flux produced by only one of the magnetizing coils is not sufficient to magnetize the core. A selector member is then automatically moved through a plurality of potential selection positions. At each of these positions, a selection arrangement cooperates with the memory storage means (magnetic cores) to test whether the particular core associated with the posiiton has been magnetized in the given sense. When the core representing the chosen record is tested by the selection arrangement, the sense of magnetization of the magnetic core is reversed, and a signal pulse is produced. This signal pulse causes the selector member to be stopped and activates reproduction means to cause the chosen record to be played.

While this system works quite well for individually chosen records, there are often times when no choice of records has been made, and the reproducing system is inactive. In many locations it is desirable that the lack of music between record choices be eliminated and that a continuous program of background music (comprising a plurality of predetermined individual records) be played during the interval between the playing of individual selections.

Also, in certain locations it is desirable to provide for optional selection of either a predetermined program of selections (such as a series of popular music records, or a series of classical music records, etc.) or individual choices of the various records available in the programmed selection mode.

The subject invention attains these objectives by providing an automatic phonograph record player having both program selection circuit means and individual record selection circuit means. Briefly, in the preferred embodiment described herein, the individual record selection circuit means is identical to that described in U.S. Pat. No. 2,923,553—Schultz et al., discussed above. Additionally, the program selection circuit means is based upon the general approach expressed in the Schultz et al. patent but is modified to provide for the selection of a complete predetermined program of records. To convert a Schultz et al.-type system for programmed selection, a larger current is supplied to one of the magnetizing coils while the other magnetizing coil is eliminated. The increased current is large enough to cause the magnetic cores magnetically connected to the remaining magnetizing coil to be magnetized in the given sense required for ultimate reproduction. Thus, a whole group of magnetizable elements (i.e., all of those cores associated with the utilized one of the magnetizing coils) will be magnetized in the given sense.

A given number of records (which may be altered by repacking the record magazine of the machine) are in the group of records associated with each of the magnetizing coils, but the number of groups constituting a program is subject to control. To accomplish this control, a plurality of switches are provided to electrically connect the desired number of magnetizing coils in a particular section, corresponding to a particular program of records, and a cam switch arrangement is used to insure that only one program is in effect at any one time. While there may be any number of programs, this embodiment will be described in terms of three programs, so that two program defining switches are utilized. The number of program defining switches can be one less than the number of programs, because the last section of coils (corresponding to the last program) can be made to consist of all the magnetizing coils not previously included in a section. Choosing a particular program, one of those delineated by the program defining switches, may be accomplished either manually by an operator or by a program timer assembly.

As in the aforementioned Schultz et al patent, a selector member moves through a number of selection positions in sequential order. A selection arrangement is associated with the selector member to cooperate with the magnetizable elements to determine if an element has been magnetized in the given sense by an appropriate "write-in" pulse. Thus, at each selection position the magnetizable element (magnetic core) in either the program selection circuit means or the individual record selection circuit means has a magnetic field (in "read-out" pulse form) applied to it by the selection arrangement. If a magnetic core has been magnetized in the given sense, the applied magnetic field reverses the magnetization of the core to an opposite sense. The reversal of magnetization causes a selection signal pulse to be produced to indicate the presence of a chosen record. This signal actuates a positioning device to cause the selector member to be stopped at the selection position to play the chosen record.

In the preferred embodiment described herein, the application of read-out pulses to the magnetic cores is further controlled by a control relay. Normally, in its de-energized state, the control relay connects the read-out pulse source to the program selection circuit means, but the presence of an individual record choice causes the control relay to be energized by a precedence circuit so as to disconnect the read-out pulses from the program selection circuit means (i.e., to disable the program selection circuit means) and to connect the read-out pulses to the individual record selection circuit means instead. Thus, an individual record choice will always be played before any additional selection is made by the program selection circuit means. Additionally, by virtue of the disabling of the program selection circuit means while an individual choice is being played, the magnetic cores associated with the records not yet played in the program will remain magnetized in the given sense. After the individual choice has been played, the programmed sequence will resume where it left off, rather than returning to the beginning of the program. Therefore, the control relay serves to maintain the memory condition of the magnetic cores in the program selection circuit means.

When the control relay is de-energized so as to connect the read-out pulses to the program selection circuit means, it is necessary to insure that only records in the chosen program will be played. This is accomplished by a memory preserving arrangement which disables the read-out pulse source when the selector member is stationed at a selection position, the corresponding magnetic core (and associate record) of which is not in the chosen program, but which is magnetized in the given sense. Disabling of the pulse source is controlled by a plurality of roller cam switches movable with the selector member. If the selector member is stationed at a selection position corresponding to a record in the program, the switches are in one position to permit the record to be played. However, if the selector member is not stationed at such a position, the switches are in another position to disable the pulse source and thus to prevent the record from being played. Since this arrangement prevents the read-out pulses from changing the sense of magnetization (memory condition) of cores corresponding to records in a program previously chosen but not completed, the subsequent choice of the incompleted program will result in the playing of the records that were not previously played during the incompleted playing of the original program.

Accordingly, it is a primary object of the present invention to provide a system to control the selection of phonograph records for playing either according to a predetermined program or according to an individual choice of a record.

A related object of this invention is to provide such a system in which an individual record chosen by a customer will be given preference and will be played before another selection is made in the program sequence.

Another related object of this invention is to provide such a system in which a program of records interrupted for the playing of an individual choice will resume with the next succeeding record in the program, rather than reverting to the beginning of the program.

A further object of this invention is to provide magnetic memory circuit means to automatically select a plurality of predetermined records according to a program sequence.

A still further object of this invention is to provide a program selection arrangement characterized by the availability of more than one program.

Still another object of this invention is to provide a program selection arrangement in which an originally selected program that was not previously completed will resume with the next succeeding record in the program when chosen again.

These and other objects, advantages, and features of the subject invention will hereinafter appear, and, for purposes of illustration, but not of limitation, an examplary embodiment of the subject invention is shown in the appended drawings, in which.

Figure 1:
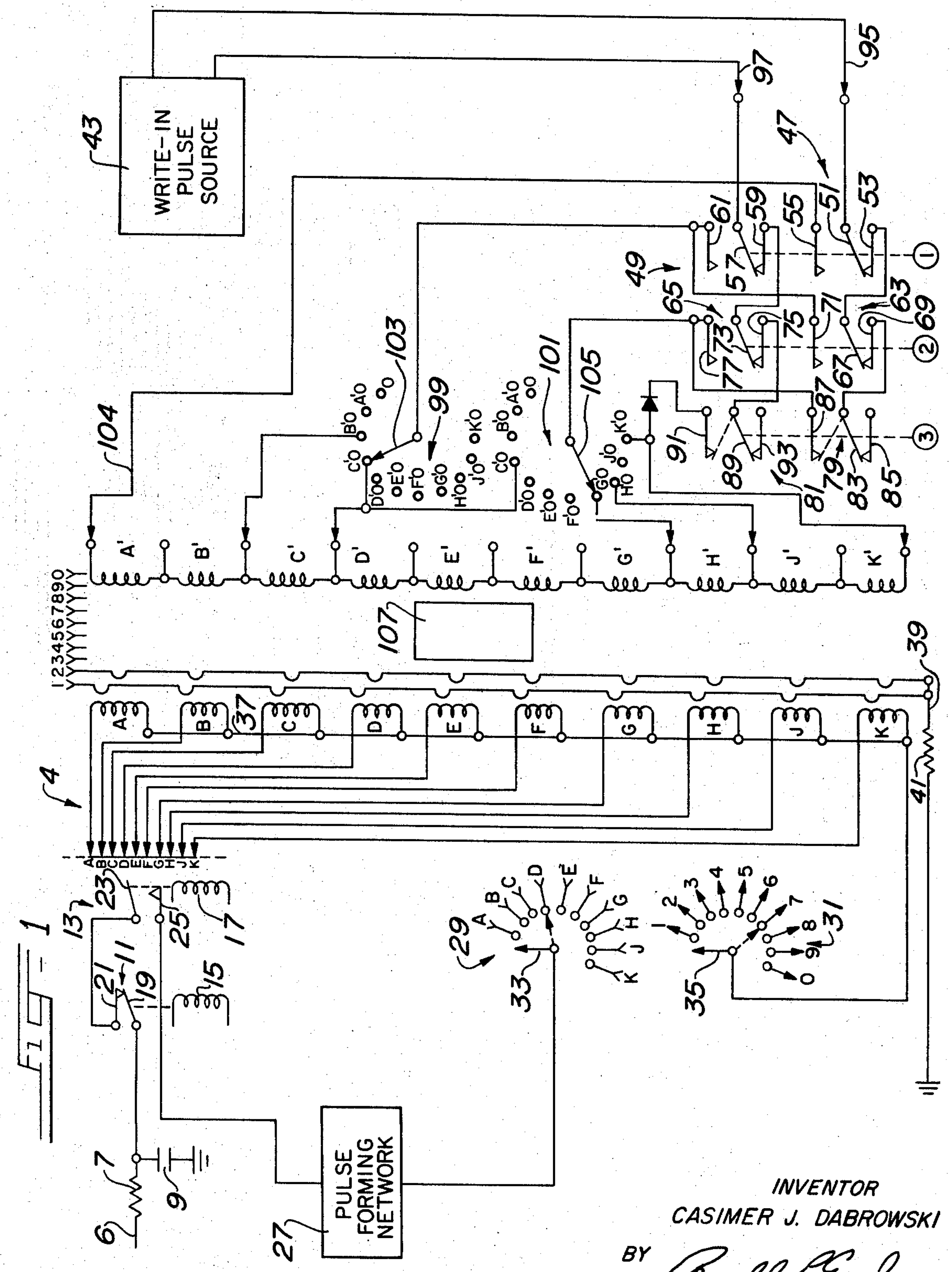
FIG. 1 is a schematic circuit diagram of the basic selection or "write-in" circuit arrangement of the preferred embodiment of the subject invention.

With reference to FIG. 1, the basic circuitry for both the program selection circuit means and the individual record selection circuit means is illustrated in schematic form. An individual record selection circuit 4 and a program selection circuit 5 are shown respectively generally to the left and generally to the right in FIG. 1. In the individual record selection circuit 4, which corresponds to the selection circuit shown in the above-mentioned Schultz et al. patent, a plurality of magnetizing coils A, B, C, D, E, F, G, H, J, K (the letter "I" being omitted to prevent confusion) are depicted. Each of the magnetizing coils A–K is magnetically connected to a plurality of magnetizing elements (of the type generally known as magnetic cores, but which are not shown) to provide A, B, etc. series of such elements in a matrix. The magnetizing coils A–K each have a plurality of separate sections with each section being associated with a separate one of the plurality of cores, but for purposes of clarification each coil A–K is shown in lumped form. For a further understanding of the matrix arrangement, reference may be made to the aforementioned Schultz et al. patent. Another plurality of magnetizing coils 1–0, with each coil similarly connected to a plurality of magnetizable elements in the matrix (not shown), is found in circuit 4. Each of the magnetizing coils A–K has one magnetizable element in common with each of the coils 1–0, so that the coupling G–6 (for example) corresponds to one and only one element in the matrix. While as described herein individual record selection circuit 4 as well as program selection circuit 5 are formed to control a total of 100 magnetic cores, corresponding to fifty records having two sides each, it should be realized that this number is used only for illustration and that any desired number of cores and records could be utilized, as required.

Figures 6, 7:
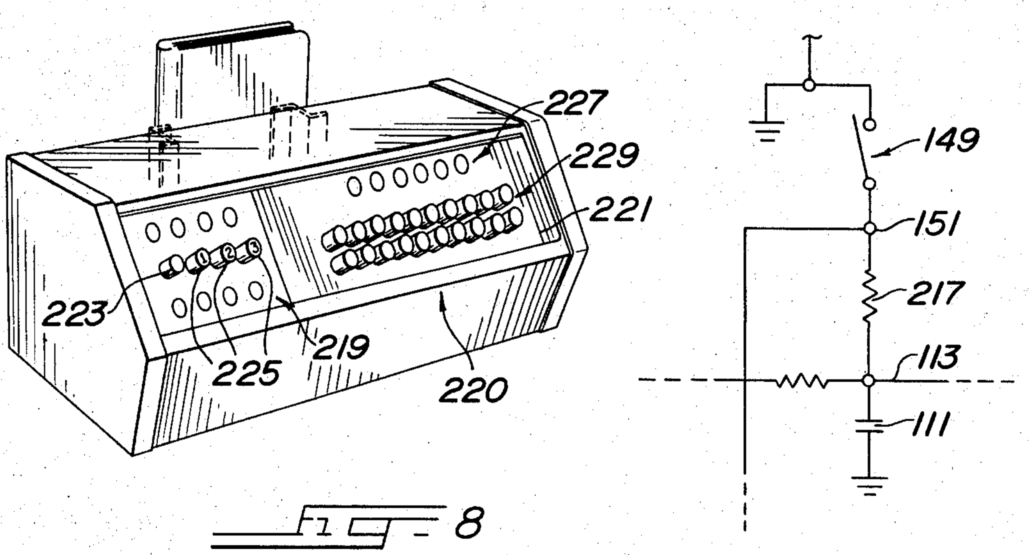
FIG. 6 is a schematic circuit diagram of a portion of a pulse producing circuit.
FIG. 7 is a perspective view of a control unit utilized in the preferred embodiment disclosed herein.

The energizing current for the magnetizing coils is in the form of a write-in pulse that is applied to circuit 4 through lead 6 and a circuit composed of resistor 7 and capacitor 9. Resistor 7 decouples the power supply from the write-in circuit, while the write-in pulse is formed across capacitor 9. The write-in pulse is then applied to a pair of relay controlled switches 11 and 13, controlled by relay coils 15 and 17, respectively. Switch 11 has a movable contact 19 and a stationary contact 21. Stationary contact 21 is connected to a movable contact 23 of switch 13, which is also provided with a stationary contact 25. In the normal condition switch 11 is closed and switch 13 is opened, as shown in FIG. 1. When relay coils 15 and 17 are energized, switch 11 is opened and switch 13 is closed. After coils 15 and 17 are de-energized, an inherent delay built into relay switch 13 causes switch 11 to close before switch 13 is opened, so that the write-in pulse is applied to a pulse forming network 27 before switch 13 opens. The pulse forming network 27 is then connected to a movable selector arm 33 of a switch 29. Switch 29 and its companion switch 31 are the means by which individual records are chosen for play by a customer. To obtain the playing of a record, the person making the choice sets both switch 29 and switch 31 to the desired positions. In selecting the proper positions, selector arm 33 of switch 29 is placed on a stationary contact from a set of contacts A–K (corresponding to magnetizing coils A–K), and a selector arm 35 of switch 31 is placed on a stationary contact from a set of contacts 1–0 (corresponding to magnetizing coils 1–0). For example, if the side of a record corresponding to magnetizing coil D and magnetizing coil 7 were the desired choice, switch 29 would be set to the "D" position (i.e., selector arm 33 on contact D), and switch 31 would be set to the "7" position (i.e., with selector 35 on contact 7). While depicted as rotary switches in FIG. 1, the switches 29 and 31 could be any type of switch that is easily maneuvered either remotely or manually to the desired positions. Preferably, switches 29 and 31 should be of a type that may be remotely set by corresponding push buttons A–K and 1–0, as shown in FIG. 7.

The switch contacts A–K are connected to similarly identified leads at the top of FIG. 1. The letters A–K also identify the magnetizing coil associated with that lead. Each of the magnetizing coils A–K has one end connected to a corresponding switch contact A–K and the other end connected to a common line 37. Common line 37 is in turn connected to movable selector 35 of switch 31.

Each of the contacts 1–0 of switch 31 is connected to similarly identified leads 1–0 at the top of FIG. 1. Each of the leads 1–0 is connected to one end of a magnetizing coil having a plurality of individual magnetizing windings (schematically illustrated as loops), with a winding of each of the magnetizing coils magnetically connected to a magnetic coil in each of the groups of magnetic cores associated with each of the magnetizing coils A–K. The other ends of magnetizing coils 1–0 are connected to a common line 39. Line 39 is connected to ground through a resistor 41.

Therefore, switch contacts A–K are connected to magnetizing coils A–K, which are connected to movable selector 35 of switch 31. Similarly, switch contacts 1–0 are connected to magnetizing coils 1–0, which are connected to ground through a resistor 41. By placing selector arm 33 on one of the contacts A–K of switch 29, and selector arm 35 on one of the contacts 1–0 of switch 31, a completed circuit for the write-in pulse is formed through one of the magnetizing coils A–K and one of the magnetizing coils 1–0 to ground. Since each of the coils A–K and 1–0 is adapted when energized to pass one-half the current required to magnetize the associated magnetic cores, as is more fully described in the aforementioned Schultz et al U.S. Pat. No. 2,923,553, this arrangement causes one and only one particular magnetic core in the matrix to be magnetized in a given sense by the joint or additive action of the energized coil from among coils A–K and the energized coil from among coils 1–0. Again using the example of a selection D–7, movable arm selector 33 of switch 29 is placed on contact D and selector element 35 of switch 31 is placed on contact 7. The write-in pulse then passes through magnetizing coil D and magnetizing coil 7 to ground. The flux generated by the magnetizing coil D and the magnetizing coil 7 is an additive direction, and the combined flux is sufficient to magnetize the common core in a given sense to indicate that the record associated with the common core (i.e., D–7) had been chosen for play. Since the flux of either coil D or coil 7 is not sufficient in itself to magnetize a magnetic core in the given sense, one and only one magnetic core will be magnetized in the given sense by the energization of both coils D and 7.

In program selection circuit 5, a modification of individual record selection circuit 4 is utilized. As an individual record selection circuit 4, a plurality of magnetizing coils A′–K′ are responding to magnetizing coils A–K, are utilized. However, since a plurality of selections, rather than a single selection, is to be made at one time, the magnetizing coils 1–0 are not utilized. To magnetize the desired magnetic cores with a single magnetizing coil, the current in magnetizing coils A′–K′ can be increased or the number of windings of A′–K′ associated with an individual magnetic core can be increased. In the specific embodiment described herein, the magnetic field of magnetizing cores A′–K′ has been increased by increasing the current that is allowed to pass therethrough. Thus, the write-in pulses have a magnitude sufficient to provide a single magnetizing coil from the plurality of coils A′–K′ with a magnetic field strong enough to magnetize a core in the given sense. These write-in pulses are obtained from a write-in pulse source 43. A pulse source (not shown) similar to pulse source 43 provides write-in pulses for circuit 4. Appropriate conventional circuitry is utilized to adjust the magnitude of the write-in pulses for respective use with either circuit 4 or circuit 5.

For purposes of this discussion, a three program arrangement will be described, but this disclosure is not limited to such an arrangement. After the totality of record selections are divided into three programs (as described below), any one of the three programs may be chosen at will by an operator. These manual choice means are schematically indicated by the circular tabs or selector buttons numbered 1, 2 and 3 in FIG. 1. While this disclosure is primarily concerned with a manual choice, it should be realized that a particular program may be chosen electrically by use of a device such as a program timer assembly. This timer arrangement is schematically indicated by the box labeled 45 in FIG. 1. Such a timer arrangement could be utilized in many different ways. For instance, a proprietor might wish to have one type of background music played during the afternoon, another type of background music played during the dinner hour, and yet a third type of background music played during the evening hours. The timer arrangement 45 would automatically provide this sequence at the desired times. However, preferably a manual choice of a program always takes precedence over a choice by the timer.

Each of the manual program choosing tabs 1, 2 and 3 controls a plurality of switches. The program choosing tab 1 has associated switches 47 and 49, with switch 47 having movable contact 51 and stationary contacts 53, 55, and switch 49 having a movable contact 57 and stationary contacts 59, 61. Program choosing tab 2 has associated switches 63 and 65, with switch 63 having a movable contact 67 and stationary contacts 69, 71, and switch 65 having a movable contact 73 and stationary contacts 75, 77. Similarly, program choosing tab 3 has associated switches 79 and 81, with switch 79 having a movable contact 83 and stationary contacts 85, 87, and switch 81 having a movable contact 89 and stationary contacts 91, 93. When no program has been chosen, movable contacts 51, 57, 67, 73, 83 and 89 are in abutment with stationary contacts 53, 59, 69, 75, 85 and 93, respectively.

Write-in pulse source 43 supplies a write-in pulse on line 95, with a return lead 97 for the pulse. If no program has been chosen, it may be seen that the write-in pulse travels through switches 47 and 63 and terminates on open-circuited stationary contact 85 of switch 79. Thus, none of the magnetizing coils A′–K′ is energized by the write-in pulse. If a program, for example program 3, is chosen to be played, movable contact 83 of switch 79 will be brought into abutment with stationary contact 87, and movable contact 89 of switch 81 will be brought into abutment with stationary contact 91, as shown by broken lines in FIG. 1. In that event, the write-in pulse will pass through switches 47, 63 and 79, magnetizing coils H′, J′ and K′, and back to the write-in pulse source through switches 81, 65 and 49. This write-in pulse will energize all of the magnetic cores associated with the magnetizing coils H′, J′ and K′, which corresponds to fifteen records or thirty selections (a selection being one side of a record).

While a particular program is chosen by manipulation of the program choosing devices 1–3, it is desirable to be able to predetermine exactly which groups of records will constitute a given program, a group of records being that series of records associated with a given one of the magnetizing coils A′–K′. This may be accomplished by the use of program definition switches 99 and 101. Each of the program definition switches 99 and 101 is provided with eleven stationary contacts 0, A′0, B′0, C′0, D′0, E′0, F′0, G′0, H′0, J′0, and K′0. These contacts represent the ends of each of the magnetizing coils A′–K′, and the records associated with these ends. Each of the stationary contacts 0–K′0 of both switch 99 and switch 101 are connected to the corresponding ends of the magnetizing coils A′–K′, although only a few such connections are shown in FIG. 1. Thus, A′0 would represent the last selection controlled by the A′ magnetizing coils, corresponding to selection A–0 in the individual record selection circuit. Additionally, program definition switch 99 has a movable selector arm 103, and program definition switch 101 has a movable selector arm 105. The use of switches 99 and 101 to yield program definition is best illustrated by reference to a specific example, such as that shown in FIG. 1. One end of the program 1 is defined by the line 104 which is permanently connected to stationary contact 55 of switch 47 and to the "0" or top (FIG. 1 orientation) end of magnetizing coil A′. The other end of program 1 is defined by the setting of the movable selector arm 103 of switch 99. For example, if the movable selector arm 103 is set at C′0, as illustrated in FIG. 1, program 1 will include magnetizing coils A′, B′ and C′ and the thirty selections (fifteen records) associated therewith. The positioning of the movable selector arm 103 will always define the last selection included in program 1, so that program 1 will consist of all the selections between the top of magnetizing coil A′ and the setting of movable selector arm 103.

In the same manner program defining switch 101 indicates the last selection that will be played in program 2. Thus, program 2 will consist of all of the selections that appear between the setting of switch 99 and the setting of switch 101. For example, if switch 101 is set to each G′0, and switch 99 is set to C′0, as illustrated in FIG. 1, program 2 will include the magnetizing coils D′–G′ and all of the associated selections. The selections that remain after the definition of program 2 compose program 3. Thus, again using the example shown in FIG. 1, program 3 includes the magnetizing coils H′, J′ and K′ and the associated selections. Program 3 is defined by the setting of switch 101 alone, since K′0 is always the end of program 3.

While the description of the program definition has been with regard to the normal or orthodox procedure of using two switches to define three programs, it should be realized that these switches may be used to define a lesser number of programs. For instance, if switch 99 were left at C′0 and switch 101 were moved to K′0 only two programs would remain. If switch 99 were also moved to K′0 then, only one program would remain. Thus, program definition switches 99 and 101 can define one, two, or three programs as desired.

A selector member is schematically represented by box 107 in FIG. 1. The selector member is a playing unit of a conventional type and is briefly discussed in U.S. Pat. No. 2,923,553—Schultz et al., wherein reference is made to U.S. Pat. No. 2,716,550—Jensen, as being directed to this type of playing unit. Selector member 107 is arranged to traverse a plurality of selection positions (not shown). Each of the selection positions corresponds to a particular magnetic core and its associated record selection. At each position there is a contact for the core in the individual record selection circuit 4, and a separate contact for the core in the program selection circuit 5. Each of these contacts are in a position to be contacted by separate brushes on selector member 107. The individual brushes are selectively supplied with read-out pulses at appropriate times. The selector member operation and the brush arrangement is described in detail in the abovementioned U.S. Pat. 2,923,553—Schultz et al., although as indicated the arrangement is modified to have dual brushes rather than a single brush. As the selector member 107 reaches each of the selection positions, a pulse will be applied to the associated magnetic core in either the individual record selection circuit or the program selection circuit, depending upon which circuit is controlling the selecting at that time. A relay arrangement, hereinafter described, connects read-out pulses to only one of the circuits at a time, while disconnecting the pulses from the other circuit, thereby disabling it.

The read-out pulse produces a magnetic flux which, when applied to the magnetic core, has a direction and a magnitude which will reverse the sense of magnetization of the core, if it is magnetized in the given sense. Reversing the magnetization of the core causes it to be magnetized in an opposite sense from the given sense, the opposite sense of magnetization being its normal, or rest, sense of magnetization. Thus, if no selection has been made and the core is already in its normal (or opposite) sense of magntization, there will no no change in its magnetic condition. However, if the record selection associated with the core has been chosen and the core is magnetized in the given sense, then the read-out pulse will reverse the sense of magnetization, and the change in flux will produce a signal pulse in a control line connected to the core. The signal obtained in the control line is applied to an actuating circuit in the selector member (not shown). The actuating circuit detects the signal and actuates a positioning device (not shown) to stop the selector member 107 at that selection position. When the selector member is stopped, it is adjacent the record selection associated with the magnetic core providing the control signal. After being stationed in this position, the selector member 107 causes the record to be removed from the magazine, which holds a plurality of records, and causes the chosen selection to be played. After the selection has been played, the record is returned to the magazine. The selector member 107 is driven in one direction to play one corresponding side of each of the records and in the opposite direction to play the other corresponding side of each of the records in accordance with actual selection controls.

Figure 2:
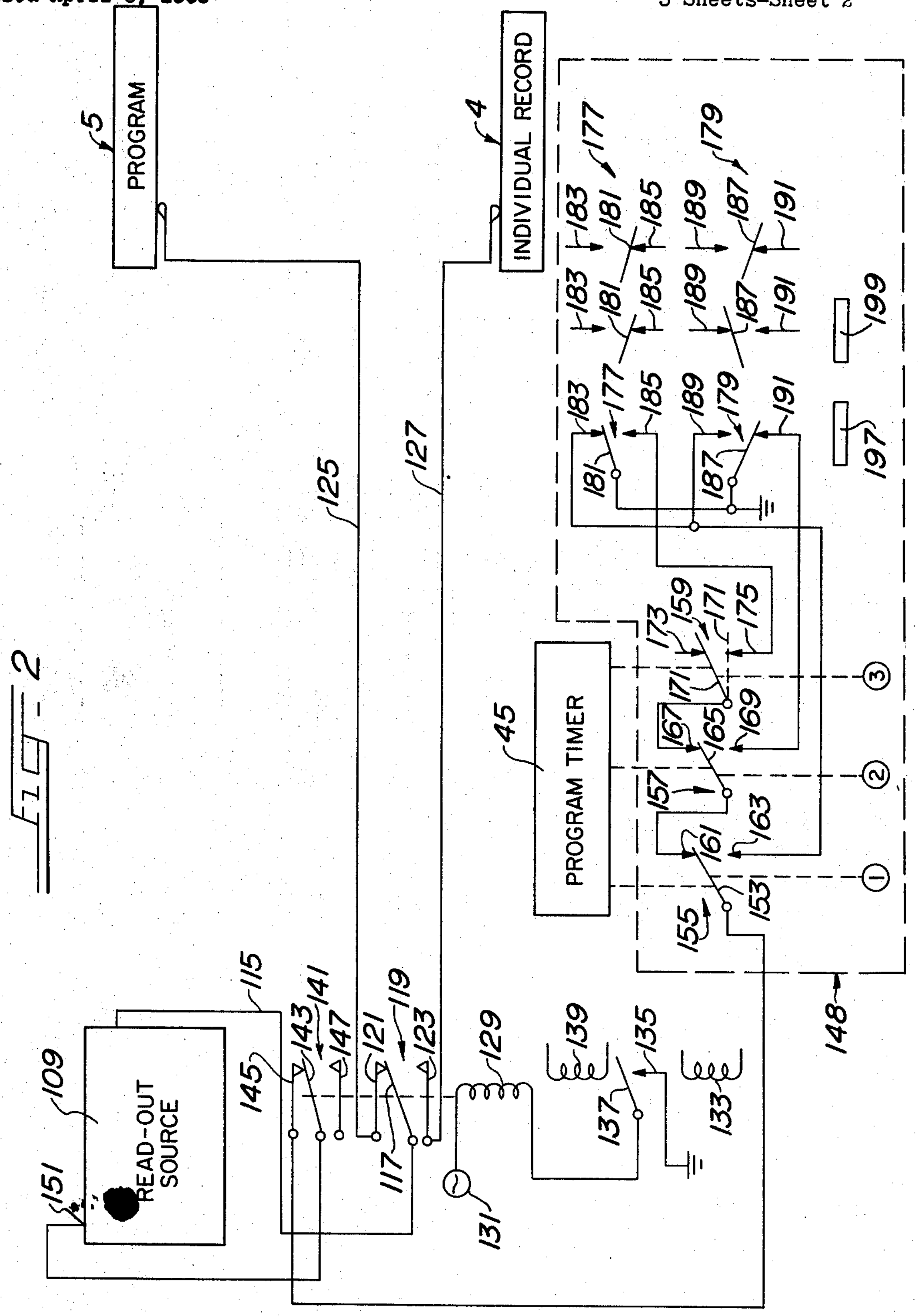
FIG. 2 is a schematic circuit diagram of the "read-out" arrangement utilized to obtain an indication of the selection of the circuit of FIG. 1.

In FIG. 2, the read-out pulse source 109 and its associated circuitry is illustrated. The pulses for read-out source 109 may be obtained in any suitable manner, but for purposes of this embodiment a pulse producing discharge capacitor, such as capacitor 111 in FIG. 6, is utilized. The discharge of capacitor 111 is electronically controlled, and the output pulses from capacitor 111 are passed through lead 113 to a delay circuit and ultimately appear on line 115, shown in FIG. 2.

Line 115 leads to a control means for the selection circuits which includes a movable contacting element 117 of a relay switch 119. Relay switch 119 also has stationary contacts 121, 123. Stationary contact 121 is connected by lead 125 to the program selection circuit, while stationary contact 123 is connected to the individual record selection circuit by lead 127. A relay coil 129 controls the positioning of movable contacting element 117 in switch 119. Relay coil 129 is energized from an AC source 131. Normally relay coil 129 is de-energized, but when an individual record selection is made, an add relay coil 133 is energized (by conventional means, not shown) to close contacts 135, 137 and thereby to energize coil 129.

After a selection has been played, the selector member 107 will travel along its path in search of another selection to be played. When the last selection has been played, this movement of the selector member will continue until one end of its path has been reached twice. Upon the selector member reading one end for the second time without an intervening selection, a subtract relay coil 139 will be energized (by conventional means, not shown), and contacts 135 and 137 will be re-opened to de-energize relay coil 129 after the last chosen selection has been played, as more fully illustrated and described in the aforementioned U.S. Pat. No. 2,923,553—Schultz et al. Of course, in the Schultz et al. patent, the activation of the subtract relay coil causes the motor drive for the playing unit to be de-activated, while in the present embodiment this system is merely switched back to the control of the program selection circuit. However, the control of the add and substract relays and the switch action is identical. Also, it should be realized that the Schultz et al. arrangement is not the only possible arrangement, but is merely exemplary of the type of function that is desired.

The relay coil 129 and switch 119 provide a control means for the selection circuits. In the normal state, when relay coil 129 is de-energized, movable contacting element 117 abuts stationary contact 121 in switch 119, and the read-out pulses are connected to the program selection circuit magnetic cores. It is important to note that switch 119 connects the read-out pulses only to one or the other of the program selection circuit 5 and the individual record selection circuit 4. Thus, if an individual selection is made, relay coil 129 will be energized, movable contacting elements 117 will abut stationary contact 123, and the read-out pulses will be connected to individual record selection circuit 4. Also, no read-out pulses will be applied to program selection circuit that were magnetized in the given sense will remain magnetized in that sense. After movable contacting elements 117 returns to stationary contact 121, the program will be continued from where it left off, rather than from the beginning of the program, as a result of the memory action of the cores. This is an important feature because it prevents repetitious play of the same few records of a program, and also balances the wear among the individual records in a program. The disabling action of relay switch 119 is responsible for this memory feature.

Another important feature of the circuit, if selection control is being exercised by the program selection circuit, is a read-out pulse source disabling circuit that includes switch 141. Switch 141 has a movable contacting element 143 and stationary contacts 145, 147. This switch is also energized by relay coil 129, so that this particular disabling circuit is not operational when the individual record selection circuit is in control of the system. The entire memory pulse source disabling cir cuit that is to be discussed, which includes switch 141 and a switching control arrangement 148, is schematically indicated by switch 149 in FIG. 6. To fully equate the circuits of FIG. 2 and FIG. 6, reference may be made to circuit comparison point 151.

When movable contacting element 143 abuts stationary contact 145, point 151 in the read-out pulse source is connected to the movable contacting element 153 of a switch 155 in switching control arrangement 148. Switch 155 is one of a trio of switches 155, 157 and 159. These three switches are controlled by the previously mentioned program choosing tabs 1, 2, and 3, as are switches 47, 49, 63, 65, 79, and 81. Alternatively, these switches may be controlled by program timer 45. As mentioned previously, the manual program choosing tabs 1, 2, and 3 take preference over any control by program timer 45.

In addition to movable contacting element 153, switch 155 has stationary contacts 161, 163, while switch 157 has a movable contacting member 165 and stationary contacts 167, 169, and switch 159 has a movable contacting element 171 and stationary contacts 173, 175. If no program is chosen, movable contacting elements 153, 165, and 171 are in the upper stand-by positions (FIG. 2 orientation) contacting stationary contacts 161, 167, and 173 respectively. When a program is chosen, the selected movable contacting element is moved to its associated lower contact, such as illustrated by the broken lines in FIG. 2 showing element 171 abutting stationary contact 175.

Stationary contacts 163, 169, and 175 are connected to stationary contacts in a pair of switches 177 and 179. Switch 177 has a movable contacting member 181 and stationary contacts 183, 185, while switch 179 has a movable contacting member 187 and stationary contacts 189, 191. Stationary contact 163 in switch 155 is connected to stationary contact 183 in switch 177 and to stationary contact 189 in switch 179. Stationary contact 169 of switch 157 is connected to stationary contact 191 of switch 179, and stationary contact 175 of switch 159 is connected to stationary contact 185 of switch 177. Both of the movable contacting members 181 and 187 of switches 177 and 179 are connected to ground.

Figure 3:
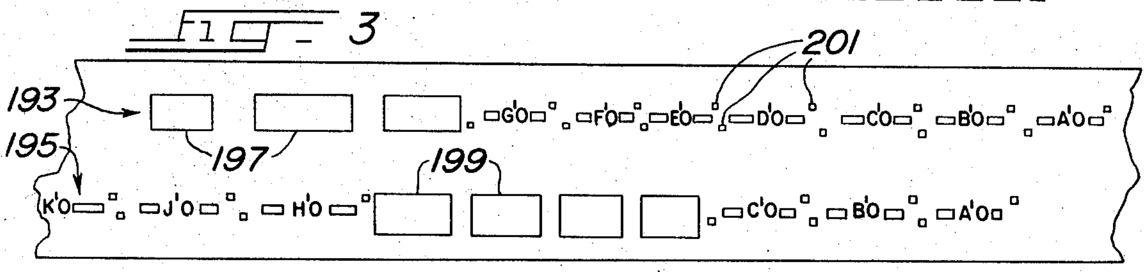
FIG. 3 is a schematic representation of a pair of cam tracks that are utilized in the preferred embodiment disclosed herein.
Figure 4:
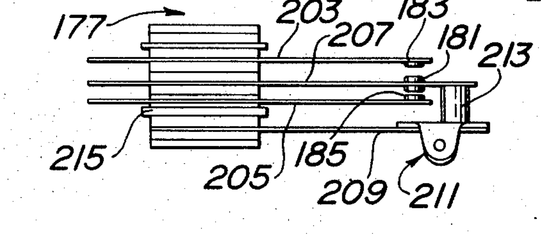
FIG. 4 is a side view of a cam switch used with a cam track as shown in FIG. 3.
Figure 5:
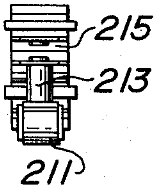
FIG. 5 is an end view of the switch shown in FIG. 4.

The switches 177 and 179 are, in physical reality, roller cam switches, such as the physical switch 177 shown in FIGS. 4 and 5. These roller cam switches are connected to selector member 107 and are conjointly moved with selector member 107 in a pair of tracks 193 and 195 (shown in FIG. 3). The positions of the movable contacting members 181 and 187 of switches 177 and 179 are controlled by cam plates 197 and 199, located in tracks 193 and 195 respectively. If there are no cam plates in either of the tracks, the switch position for switches 177 and 179 is that shown at the far right in FIG. 2. If there is one or more cam plates 199 in track 195, the switch positions when the roller cam is stationed on a cam plate will be those shown at the center in FIG. 2. If there is one or more cam plates 197 in track 193, the switch positions when the roller cam is stationed on a cam plate are those shown at the left in FIG. 2.

The purpose of the cam switches, and the entire memory circuit characterized by switch 149, is very similar to the purpose of switch 119. Switch 119 guarantees that the sense of magnetization (or memory) of magnetic cores in the program selection circuit will not be lost when an individual selection is made. In the same manner, it is desirable to prevent loss of a sense of magnetization of magnetic cores in a program, if a different program is selected before the first program is completed. Without such a provision the selector member would continue its traversal of the selection positions of the originally chosen program and the read-out pulses would return the cores to their normal sense, thus causing the originally chosen program to be played to the end before the later chosen program could be played. Besides providing that only the last chosen program will be played, the memory circuit characterized by switch 149 provides that when the originally chosen program is again chosen it will begin where it left off, rather than at the very beginning. Switch means (not shown) are employed to prevent all of the magnetic cores in a re-chosen program from being magnetized in the given sense until all of the records in the program have been played. This memory function again serves to prevent repetitious playing of the same records in the program and also distributes the wear among the records in the program.

To achieve the read-out disabling result, a pair of staggered cam tracks 193 and 195 and cam plates 197 and 199 (FIG. 3) and a pair of roller cam switches (FIG. 4) are included in the system. Cam tracks 193 and 195 are provided with openings 201 at spaced intervals to provide a fastening arrangement for cam plates 197 and 199.

As an aid in understanding the operation of the cam plate arrangement, a specific example, a shown in FIG. 3, will be described. In this example fifteen records (thirty selections) have been included in the first program, twenty records (forty selections) have been included in the second program, and fifteen records (thirty selections) have been included in the third program. Thus, in FIG. 1, the movable contact member 103 of switch 99 would be placed on C'0 and the movable contact member 105 of switch 101 would be placed on G'0. In FIG.

3 it is seen that cam plates 197 are located in positions corresponding to H'0, J'0, K'0 on track 193 (these are the magnetizing coils in program 3). On cam track 195 cam plates 199 are located in positions corresponding to D'0, E'0, F'0 and G'0 (these are the magnetizing coils in program 2).

Assuming that the selector member 107 is moving in a right to left direction (during operation the selector member will alternately move from left to right and right to left), the following operation will occur. If the selector member is at the right hand end (FIG. 3) of its travel, there are no cam plates in cam tracks 193 and 195, and the switches 177 and 179 would be in the positions shown at the far right in FIG. 2. This may be thought of as the program 1 condition. If the program choosing device 1 is actuated, the movable contacting member 153 of switch 155 is transferred to stationary contact 163, which is connected to stationary contact 183 of switch 177. Thus, the read-out disabling circuit is not completed for program 1 as long as cam switches 177 and 179 stay in the position shown, and read-out pulses are passed to the appropriate magnetic cores associated with records in program 1. However, if program choosing tab 2 or 3 is actuated by pushing its manual control tab button, the read-out pulse source disabling circuit would be completed to ground.

The manual control buttons used in these devices are a conventional lock-out type so that if program choosing tab 2 should be pushed, tab 1 would be released, and movable contact 153 would be returned to stationary contact 161. For instance, if program 2 were chosen, movable contact 165 would be positioned on stationary contact 169, and the read-out disabling circuit would be connected to stationary contact 191 of switch 179. As seen at the far right in FIG. 2, the movable contact 187 of switch 179 is abutting stationary contact 191 so that the read-out pulse source disabling circuit is completed to ground, and no read-out pulses would be furnished while selector member 107 is stationed at the selection positions corresponding to magnetic cores magnetically connected to coils A', B' and C'. Similarly, if program 3 were chosen, the read-out disabling circuit would be completed through stationary contact 175 of switch 159 and stationary contact 185 of switch 177.

When selector member 107 and associated cam switches 177, 179 have reached a position where the roller of cam switch 179 is on a cam plate 199, the switch positions would be those shown in the middle diagram of FIG. 2. This may be thought of as the program 2 condition. If program 2 were chosen, the read-out pulse source disabling circuit would be completed through movable contact 165 and stationary contact 169 to stationary contact 191. However, the circuit would end there as the movable contact 187 of switch 179 is abutting stationary contact 189, rather than 191. On the other hand, if either program 1 or 3 were chosen at this time, the read-out disabiling circuit would be actuated. If program 1 were chosen, the circuit would be completed through stationary contact 189 and movable contact 187 of switch 179, while if program 3 were chosen the circuit would be completed through stationary contact 185 and movable contact 181 of switch 177.

Similarly, the movement of selector member 107 to a point where the cam roller of cam switch 177 is positioned on a cam plate 197 yields the switch positions shown at the left in FIG. 2. This may be thought of as the program 3 condition, and the read-out disabling circuit would not be completed if program 3 were chosen, but would be if programs 1 or 2 were chosen. Cam plates 197 and 199 are never used to simultaneously position movable contacting member 181 on stationary contact 183 and movable contacting member 187 on stationary contact 189, because the read-out disabling circuit would not be completed for either program 2 or program 3 selections. As discussed above, the proper use of these cam plate arrangements prevents a reversal of the sense of magnetization, and a loss of the memory condition of magnetic cores not associated with the chosen program.

As previously indicated, FIGS. 4 and 5 illustrate the rolling cam type of switch utlized in conjunction with tracks 193 and 195 shown in FIG. 3. For purposes of illustration, switch 177 is shown, but switch 179 is structurally the same. Stationary contacts 183, 185 and movable contact 181 are located on spring metal arms 203, 205, and 207, respectively. A fourth spring metal arm 209 supports a roller cam 211. Arm 209 also supports an insulating separator 213, which is connected to arm 207 at its outer end. All four of the arms 203, 205, 207, and 209 are supported at their fixed ends in a block of insulating material 215.

In operation, roller 211 would roll along track 193 (track 195 for switch 179). In the part of track 193 in which there is no cam plate, the switch contacts would be as shown in FIG. 4. If, however, roller 211 were to be positioned on a cam plate 197, arm 209 would be flexed upwardly, and separator 213 would force arm 207 upward to open contacts 181, 185 and close contacts 181, 183. By utilizing a similar arrangement for switch 179, the results described in connection with the schematic circuit diagrams of FIG. 2 would be achieved.

Another feature of the cam plates 197 and 199 is that they may be used to control the contents of a program. Again using the specific example shown in FIG. 3, if a cam plate were placed in A'0, B'0 or C'0 in either track 193 or track 195, the read-out source would be disabled for that interval, if the program choosing device 1 were depressed. Even if program 2 or 3 were originally chosen (depending upon which track the cam plate is in), those selections would not be played due to the setting of switches 199 and 201. In other words, the magnetic cores associated with that group of records would not have been magnetized in the given direction, so that the read-out pulses would not produce a change in the sense of magnetization. The one difficulty with using this method to eliminate certain groups from a chosen program is that, if the program from which the group is being eliminated were originally chosen and then another program corresponding to the setting of the cam plate were chosen, the magnetic cores associated with the eliminated group would still be magnetized so that they would be included within the playing of the second chosen group. Thus, there is a restriction on the use of the method for defining the program, but it may be useful in some instances. Perhaps the best example of its use would be when all of the magnetizing coils A'–K' were placed in one program from which it was desired to eliminate certain scattered groups of records.

The results of completing the disabling circuit to ground is illustrated in FIG. 6. As mentioned before, capacitator 111 is a primary source of the read-out pulses. The effect of closing the read-out disabling circuit is that of closing switch 149 in FIG. 6. When switch 149 is closed, capacitor 111 is grounded through resistor 217. This grounding action bleeds off the charge on capacitor 111 and prevents the production of read-out pulses. Thus, the read-out pulse source is disabled, and no read-out pulses are applied to the magnetic cores in the program selection circuit. It should be realized that only a minor portion of the read-out pulse circuit is shown in FIG. 6, and that the unconnected leads are, in actuality, connected to appropriate terminals in the read-out pulse circuit.

In FIG. 7, a control panel 220 for the remote selector unit is illustrated. Control panel 220 is broken into a left-hand portion 219 and a right-hand portion 221. Left-hand portion 219 of control panel 220 includes the controls for program selection circuit 5, while right-hand portion 221 contains the controls for individual record selection circuit 4. The program selection circuit controls include a timer control 223 (for using program timer assembly 45, if desired) and manual program choosing tabs 225 in the form of conventional push buttons interconnected in a conventional lock-out arrangement, so that pushing any one of the buttons will cause the other buttons to be placed in their non-chosen position. These manual selection tabs or buttons 225 correspond to the program choosing tabs numbered 1, 2, and 3 in FIGS. 1 and 2. In right-hand portion 221 of control panel 220, the individual selection circuit controls comprise a single line of general controls 227 and a double row of individual selection buttons 229.

Figure 8:
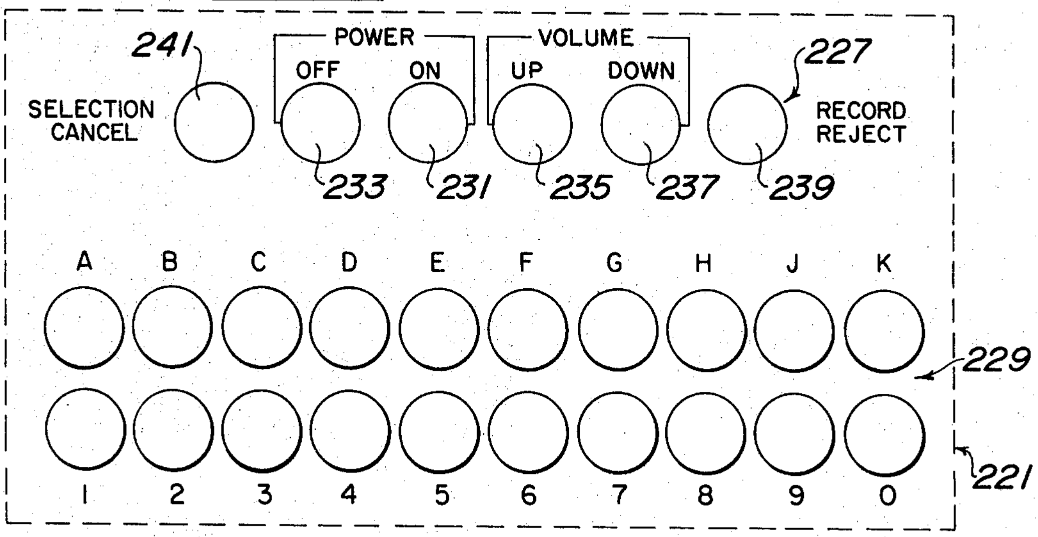
FIG. 8 is an exploded view of the right-hand section of the panel of the control unit shown in FIG. 7.

The right-hand portion 221 of the control panel is shown in further detail in FIG. 8, from which it may be seen that general controls 227 include a power-on button 231 and a power-off button 233, as well as volume control buttons 235 and 237. Additionally, general controls 227 include a record reject button 239 and a selection cancel button 241. All of these general control functions are self-explanatory and conventional and may be achieved by any one of various well-known arrangements utilized to achieve these functions.

The double row of individual selection control buttons consists of a row of buttons labeled A–K and a second row labeled 1–0. These labels correspond to the identical set of letters and numbers shown in switches 29 and 31 and constitute the means by which a customer makes a choice of an individual recording to be played. All of these control buttons are of a standard type well known in the art.

Although the embodiment disclosed herein has been described in terms of disk records, it should be realized that this invention is also applicable to other types of pre-recorded music, such as tape systems, and thus the word "record" as used herein refers to any type of pre-recorded music bearing arrangement.

What is claimed is:

1. A system for controlling the selection of records to be played comprising:

first program selection circuit means arranged to control the automatic selection of a plurality of records according to a predetermined program choice, each program comprising a plurality of individual record choices also available for individual selection;

second individual selection circuit means arranged to control the selection of individual record choices;

read-out selector means responsive to said first and second circuit means for effecting selection and reproduction of selected records for either programmed sequential play or individual selection play;

disabling means for preventing selection of records by one of said circuit means when the other circuit means is controlling the selection of records; and precedence means for insuring that an individual record choice can be selected for reproduction by said second circuit means before any additional selections are made by said first circuit means.

2. A system as recited in claim 1, and further comprising:

memory preserving means for insuring, when a program has been chosen a first time by said first circuit means and only partially reproduced, that any subsequent choice of the same program will result in the selection of the records not played during the previous partial playing of the program.

3. A system as recited in claim 1, and further comprising:

first memory storage means associated with said first circuit means for indicating that a particular record has been selected to be played because of its inclusion in a chosen program; and second memory storage means associated with said second circuit means for indicating that a particular record has been selected to be played because of an individual choice, each of said memory storage means being adapted to cooperate with said read-out selector means to produce a signal to convey the information that a given record has been selected to be played.

4. A system as recited in claim 3, wherein each of said first and second memory storage means comprises a plurality of memory storage devices, each of said devices associated being with an individual record selection and having a given memory condition to indicate that its associated selection has been chosen to be played, said read-out selector means being adapted to change the memory condition of a given one of said memory storage devices in order to produce said information-conveying signal.

5. A system as recited in claim 4, and further comprising:

a source of pulses to change the memory condition of a given one of said memory storage devices and thereby produce said information conveying signal; and control means for actuating said disabling means to connect said source of pulse to only one of said first and second circuit means at a time so that the other of said said circuit means is prevented from controlling selections.

6. A system as recited in claim 5, wherein said control means and said disabling means comprise a control relay which connects said source of pulses to said first circuit means when the relay is in one state of energization and which connects said source of pulses to said second circuit means when the relay is in another state of energization.

7. A system as recited in claim 2 wherein:

said first circuit means comprises a first series of magnetizable elements, each of said magnetizable elements being correspondingly associated with one of the record selections and being magnetizable in a plurality of different senses, said first series of magnetizable elements being associated with means for magnetizing a particular one of the first series of magnetizable elements in a given sense if the selection associated with said particular one element is included in a program chosen to be played;

said second circuit means comprises a second series of magnetizable elements, each of said magnetizable elements being correspondingly associated with one of the record selections and being magnetizable in a plurality of different senses, said second series of magnetizable elements being associated with means for magnetizing a particular one of the second series of magnetizable elements in a given sense if the selection associated with said particular one element is individually chosen to be played; and said read-out selector means comprises a selector member movable through a plurality of selection positions, each position corresponding to an individual selection, and arrestable in a particular selection position to effect reproduction of the corresponding selection, said selector member being associated with read-out selection means for applying a field which magnetizes in a sense opposite to said given sense one of the two magnetizable elements associated with an individual selection in the first and second series of said magnetizable elements.

8. A system as recited in claim 7, wherein:

said read-out selector means comprises a source of pulses adapted to magnetize each of said magnetizable elements in a sense opposite to said given sense;

the system further comprises a control relay having a first set of switch contacts and a second set of switch contacts, said relay being energized by said precedence means only when a selection is individually chosen by said second circuit means, said first switch contacts connecting said source of pulses to said first circuit means when said control relay is energized; and and connecting said source of pulses to said second circuit means when said control relay is energized; and said memory means comprises a pulse source disabling means adapted to prevent the production of pulses when said first circuit means is conditioned to control record selections in a first chosen program and said selector member happens to be stationed in a selection position corresponding to one of the remaining selections of a second previously chosen program that was only partially completed, whereby the magnetizable elements associated with the said remaining selections of said second previously chosen and partially completed program remain magnetized in the given sense during play of said first chosen program, said second switch contacts conditioning said pulse source disabling means for operation only when said relay is de-energized and said first circuit means are conditioned to control record selections in a given chosen program.

9. A system as recited in claim 8 wherein said pulse source disabling means comprises:

first switch means responsive to the selection of a particular program;

second switch means responsive to the stationing of said selector member at selection positions corresponding to the selections available in particular programs; and means interconnecting said first and second switch means in such a manner that the pulse source disabling means is actuated only when said selector member is stationed at a selection position corresponding to a selection not included within the particular program that is chosen for play.

10. A system as claimed in claim 9, wherein said first switch means comprises a plurality of button-operated switches, one for each program.

11. A system as recited in claim 9, wherein said second switch means comprises:

a plurality of roller cam switches, each switch having a roller cam that is movable in a cam track; and at least one cam plate situated in each of said cam tracks at predetermined locations, an individual roller cam switch being actuated when the roller cam of said individual roller cam switch contacts a cam plate in its cam track.

12. A system for controlling the selection of records for playing according to predetermined programs comprising:

a plurality of magnetizable elements, each magnetizable element associated with an individual selection and being magnetizable in a plurality of different senses;

a plurality of magnetizing coils to magnetize said magnetizable elements, each of said coils being magnetically connected to a separate group of magnetizable elements;

a first plurality of switches arranged to define a plurality of programs by dividing said magnetizing coils into sections having a desired number of magnetizing coils, each section having a corresponding plurality of groups of magnetizable elements magnetically connected to the magnetizing coils included in the section, whereby programs of records represented by the sections of magnetizing coils are defined;

a second plurality of switches, each switch in said second plurality related to a particular program and actuated by the choice of the related program to control the energization of the section of magnetizing coils representative of the program and thus to magnetize the corresponding groups of magnetizable elements in a given sense;

a selector member movable through a plurality of selection positions, each selection position corresponding to an individual record selection, and arrestable in a particular selection position to play the corresponding record selection;

a source of pulses including a pulse producing discharge capacitor adapted to magnetize said magnetizable elements in a sense opposite to said given sense in order to provide an information-conveying readout signal to effect selections; and pulse source disabling means to prevent the production of pulses when a switch in said second plurality of switches is actuated by the choice of its related program and said selector member is stationed in a selection position corresponding to one of the remaining selections of a program that was previously chosen and only partially completed, whereby the magnetizable elements associated with the remaining selections of the previously chosen and partially completed program remain magnetized in the given sense during play of said related program.

13. A system as recited in claim 12, wherein said pulse source disabling means comprises:

first switch means responsive to the selection of a particular program;

second switch means responsive to the stationing of said selector member at selection positions corresponding to the selections available in particular programs; and means interconnecting said first and second switch means in such a manner that the pulse source disabling means is actuated only when said selector member is stationed at a selection position corresponding to a selection not included within the particular program that is chosen for play.

14. A system as claimed in claim 13, wherein said first switch means comprises a plurality of button-operated switches, one for each program.

15. A system as recited in claim 13, wherein said second switch means comprises:

a plurality of roller cam switches, each switch having a roller cam that is movable in a cam track; and at least one cam plate situated in each of said cam tracks at predetermined locations, an individual roller cam switch being actuated when the roller cam of said individual roller cam switch contacts a cam plate in its cam track.

16. A system as recited in claim 5 and further comprising pulse source disabling means adapted to prevent the production of pulses when said first circuit means is conditioned to control selections in a first chosen program and said read-out selector means is arranged to change the memory condition of a given one of the memory storage devices associated with the remaining selections of a second previously chosen program that was only partially completed and that may be subsequently re-chosen, whereby the memory condition of the memory storage devices associated with the selections in said second previously chosen and partially completed program is not changed during play of said first chosen program.

17. A system as recited in claim 6 wherein said precedence means comprises a precedence relay which is actuated upon choice of an individual selection to energize said control relay and thereby prevent said source of pulses from being connected to the memory storage devices associated with said first circuit means to change their memory conditions when said second circuit means is conditioned for controlling selections.

References Cited

UNITED STATES PATENTS

| | | | |
|---|---|---|---|
| 2,907,571 | 10/1959 | Duckworth | 340—162 X |
| 2,923,553 | 2/1960 | Schultz et al. | 340—162 X |
| 3,147,346 | 9/1964 | Herman | 340—162 X |

THOMAS R. HABECKER, Primary Examiner

M. SLOBASKY, Assistant Examiner

U.S. Cl. X.R.

179—100.1; 340—147, 152, 365